United States Patent
Carralero et al.

(10) Patent No.: US 11,454,643 B2
(45) Date of Patent: Sep. 27, 2022

(54) METHOD OF COLLECTING MEASUREMENTS FOR ESTIMATING AIR DATA PARAMETERS OF AN AEROSPACE VEHICLE

(71) Applicant: The Boeing Company, Chicago, IL (US)

(72) Inventors: Michael A Carralero, Huntington Beach, WA (US); Kumar G Bhatia, Mercer Island, WA (US); Robert M Dowgwillo, St. Louis, MO (US); Matthew G Rendos, Castle Rock, CO (US); Albert T Stephens, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 213 days.

(21) Appl. No.: 16/867,315

(22) Filed: May 5, 2020

(65) Prior Publication Data
US 2021/0349121 A1    Nov. 11, 2021

(51) Int. Cl.
*G01P 5/26* (2006.01)
*G01P 13/02* (2006.01)
(Continued)

(52) U.S. Cl.
CPC ............... *G01P 5/26* (2013.01); *B64D 43/00* (2013.01); *G01P 13/025* (2013.01); *G01S 17/95* (2013.01)

(58) Field of Classification Search
CPC ........ G01P 13/025; G01P 5/165; G01P 13/02; G01P 5/14; G01P 5/16; G01P 5/00;
(Continued)

(56) References Cited

U.S. PATENT DOCUMENTS

| | | | |
|---|---|---|---|
| 6,672,152 B2* | 1/2004 | Rouse | G01P 5/14 |
| | | | 73/170.01 |
| 9,007,227 B2* | 4/2015 | Carralero | G01D 5/3538 |
| | | | 356/73.1 |
| 10,800,508 B2* | 10/2020 | Gendre | B64D 45/00 |
| 10,833,774 B2* | 11/2020 | Laughlin | H04B 10/66 |
| 10,884,016 B2* | 1/2021 | Sly | G01P 5/16 |

(Continued)

FOREIGN PATENT DOCUMENTS

| | | | | |
|---|---|---|---|---|
| CA | 3031952 A1 * | 9/2019 | | B64D 45/00 |
| WO | WO-2018009599 A1 * | 1/2018 | | G01P 5/26 |

*Primary Examiner* — Andre J Allen
(74) *Attorney, Agent, or Firm* — Vivacqua Crane, PLLC (57) ABSTRACT

A method of collecting measurements for estimating one or more air data parameters of an aerospace vehicle is disclosed. The method includes converting, by an array of optical sensors, incident light into an optical signal indicating a measurement for estimating the one or more air data parameters. The array of optical sensors is disposed along a skin of the aerospace vehicle. The method includes measuring, by an interrogator, a wavelength of a combined optical signal, wherein the combined optical signal is a combination of the optical signals generated by each of the optical sensors that are part of the array. The method further includes converting, by the interrogator, the wavelength of the optical signal into an electronic signal indicating either the measurement for estimating the one or more air data parameters. Finally, the method includes sending the electronic signal indicating the measurement to a platform network.

20 Claims, 8 Drawing Sheets

(51) Int. Cl.
*G01S 17/95* (2006.01)
*B64D 43/00* (2006.01)

(58) Field of Classification Search
CPC .... G01P 5/02; G01P 5/12; G01P 5/245; G01P 21/025; G01P 5/07; G01P 5/04; G01P 1/02; G01P 1/08; G01P 5/10; G01P 5/06; G01P 5/18; G01P 5/26; G01P 13/045; G01P 5/005; G01P 5/08; G01P 21/00; G01P 3/62; G01P 5/175; G01P 5/24; G01P 15/00; G01P 15/036; G01P 5/006; G01P 5/083; G01P 5/086; G01P 5/241; G01P 7/00; G01P 5/001; B64D 43/02; B64D 15/20; B64D 43/00; B64D 15/12; B64D 1/18; B64D 1/20; B64D 15/16; B64D 15/22; B64D 2033/0286; B64D 33/02; B64D 45/00; B64D 33/08
See application file for complete search history.

(56) References Cited

U.S. PATENT DOCUMENTS

| | | | |
|---|---|---|---|
| 2001/0054311 A1* | 12/2001 | Hakenesch | G01M 9/062 73/170.02 |
| 2003/0219252 A1* | 11/2003 | Hays | G01S 17/58 398/118 |
| 2004/0027570 A1* | 2/2004 | Caldwell | G01S 17/95 356/28 |
| 2006/0262324 A1* | 11/2006 | Hays | G01P 5/26 356/519 |
| 2008/0117419 A1* | 5/2008 | Hays | G01S 17/58 356/342 |
| 2011/0219869 A1* | 9/2011 | Asahara | G01S 17/95 73/181 |
| 2015/0338344 A1* | 11/2015 | Carralero | A61B 5/0066 250/227.11 |
| 2019/0094256 A1* | 3/2019 | Naslund | G01P 5/26 |
| 2020/0013464 A1* | 1/2020 | Wood | G11C 13/042 |

* cited by examiner

METHOD OF COLLECTING MEASUREMENTS FOR ESTIMATING AIR DATA PARAMETERS OF AN AEROSPACE VEHICLE

INTRODUCTION

The present disclosure relates to a method of collecting measurements for estimating air data parameters for an aerospace vehicle. More particularly, the present disclosure is directed towards a method of collecting measurements using optical sensors, where the measurements are used to estimate air data parameters.

BACKGROUND

An air data system for an aircraft is used to calculate air data values such as, but not limited to, airspeed, angle of attack, angle of sideslip, and free stream static pressure. The air data system may include pitot tubes, static ports, angle of attack vanes, and total temperature probes for collecting measurements that are used to calculate the various air data values. For example, a pitot probe is mounted upon an aircraft and typically includes a hollow tube that contains air. The pressure within the pitot probe provides a stagnation pressure measurement, which is referred to as total pressure. The total pressure is combined with a static pressure, which is measured by static ports, to determine dynamic pressure. The dynamic pressure is used to determine airspeed, and the angle of attack vanes are used to directly measure the angle of attack.

Some of the sensors used to collect air data values, such as the pitot tube and the angle of attack vane, project in an outward direction away from the skin of the aircraft. As a result, these sensors tend to be more susceptible to issues such as, for example, damage caused by birds or ice impacting the aircraft. Furthermore, some of the air data sensors such as the pitot tube may require heaters to prevent moisture that accumulate in the pitot tube's pneumatic lines from freezing. Moreover, holes are drilled into the skin of an aircraft when installing sensors such as a pitot tube or the angle of attack vane, which may affect the distribution of stress. Finally, sensors that protrude from the skin of the aircraft have specific packing constraints that accommodate the sensor's geometry. As a result, sometimes the air data sensors may be installed in an area of the aircraft that is typically difficult for an individual to access.

SUMMARY

According to several aspects, a method of collecting measurements for estimating one or more air data parameters of an aerospace vehicle is disclosed. The method includes converting, by an array of optical sensors, incident light into an optical signal indicating a measurement for estimating the one or more air data parameters. The array of optical sensors is disposed along a skin of the aerospace vehicle. The method includes measuring, by an interrogator, a wavelength of a combined optical signal, wherein the combined optical signal is a combination of the optical signals generated by each of the optical sensors that are part of the array. The method further includes converting, by the interrogator, the wavelength of the optical signal into an electronic signal indicating either the measurement for estimating the one or more air data parameters. Finally, the method includes sending the electronic signal indicating the measurement to a platform network for estimating the one or more air data parameters of the aerospace vehicle.

According to another aspect, a method of collecting measurements for estimating one or more air data parameters by an optical network that is part of an aerospace vehicle is disclosed. The method includes converting, by an array of optical sensors, incident light into an optical signal indicating either a measurement for estimating the one or more air data parameters. The array of optical sensors is disposed along a skin of the aerospace vehicle, and the optical network includes a plurality of arrays of optical sensors. The method includes measuring, by a plurality of interrogators, a wavelength of a combined optical signal for each of the plurality of arrays of optical sensors that are part of the optical network. The method also includes converting, by the plurality of interrogators, the wavelength of the combined optical signal for each of the plurality of arrays of optical sensors into a corresponding electronic signal indicating the measurement for estimating the one or more air data parameters. Finally, the method includes sending the corresponding electronic signal indicating the measurement to a platform network for estimating the one or more air data parameters of the aerospace vehicle.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The present disclosure is directed towards a method of collecting measurements for estimating air data parameters for an aerospace vehicle, where the measurements are collected by optical sensors. The optical sensors are mounted to a skin of the aerospace vehicle and are embedded within a thin film. The optical sensors are configured to collect either pressure data or temperature data, and thereby replace conventional sensors that are typically used to collect these measurements such as, for example, pitot tubes and static ports. Specifically, the aerospace vehicle includes a plurality of arrays of optical sensors. Each optical sensor converts incident light into an optical signal indicating either a pressure measurement or a temperature measurement that is used for estimating one or more air data parameters.

The following description is merely exemplary in nature and is not intended to limit the present disclosure, application, or uses.

Figure 1:
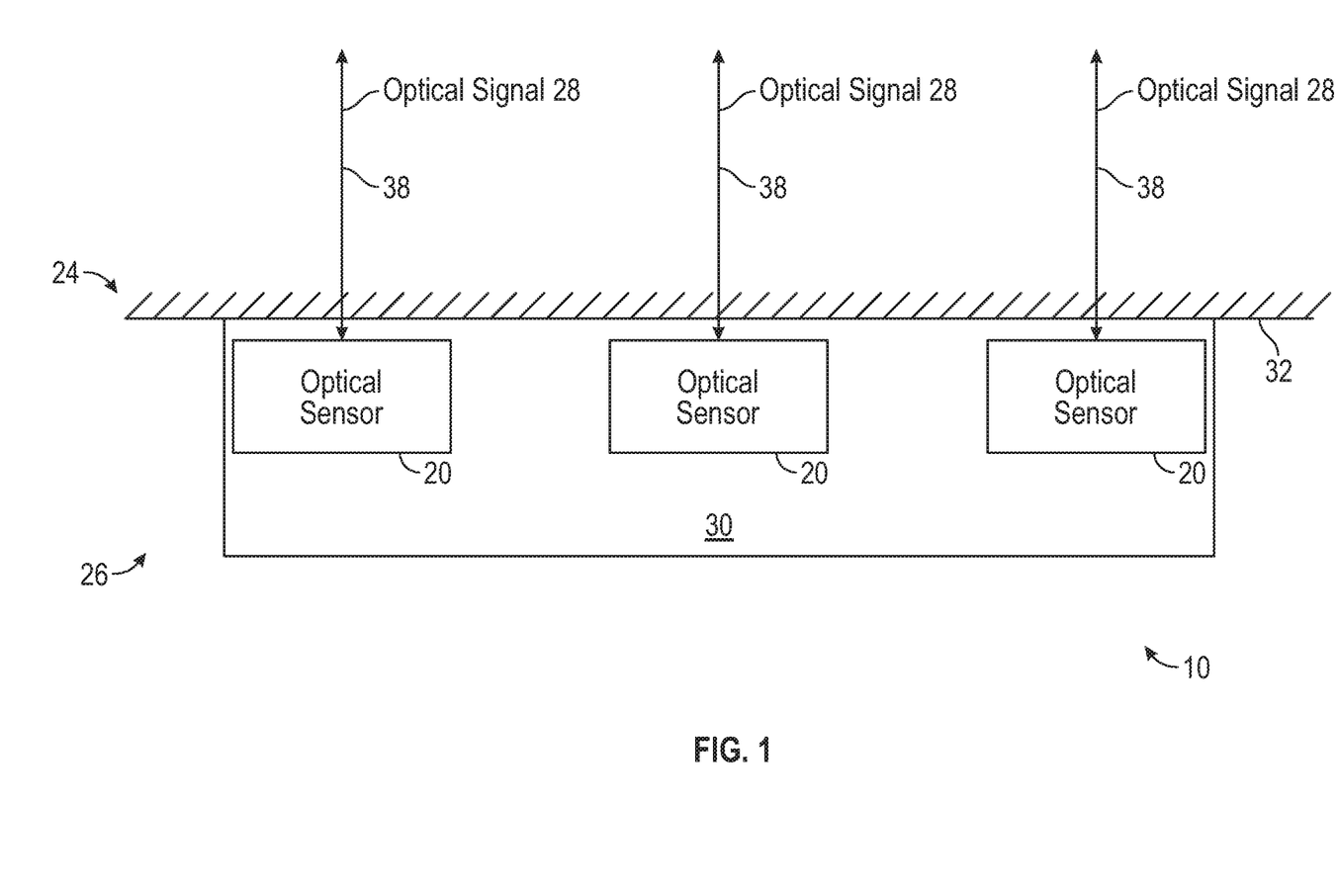
FIG. 1 is a schematic diagram of an array of optical sensors disposed along a skin of an aerospace vehicle, according to an exemplary embodiment.

Referring to FIG. 1, an exemplary array 10 of optical sensors 20 is shown. As seen in FIG. 1, the array 10 of optical sensors 20 is disposed along a skin 24 of an aerospace vehicle 26. The aerospace vehicle 26 represents any type of vehicle that collects measurements for estimating air data parameters such as, but not limited to, an aircraft or an unmanned air vehicle (UAV). The optical sensors 20 are embedded in a thin film 30. The thin film 30 is disposed along an outer surface 32 of the skin 24 of the aerospace vehicle 26. As seen in FIG. 1, the optical sensors 20 are embedded completely within the thin film 30. Accordingly, it is to be appreciated that the thin film 30 protects the optical sensors 20 from environmental factors. In one embodiment, the individual optical sensors 20 are constructed of silicon. The thin film 30 is attached directly to the outer surface 32 of the skin 24 of the aerospace vehicle 26. A corresponding fiber optic cable 38 is provided for each optical sensor 20 that is part of the array 10.

The optical sensors 20 are each configured to generate an optical signal 28, where the optical signal 28 indicates a measurement for estimating the one or more air data parameters of the aerospace vehicle 26. Specifically, the measurement for estimating the one or more air data parameters is either pressure data or temperature data. Some examples of the air data parameters that are estimated include, but are not limited to, angle of sideslip, total pressure, static pressure, static temperature, and air speed of the aerospace vehicle 26.

Figure 2:
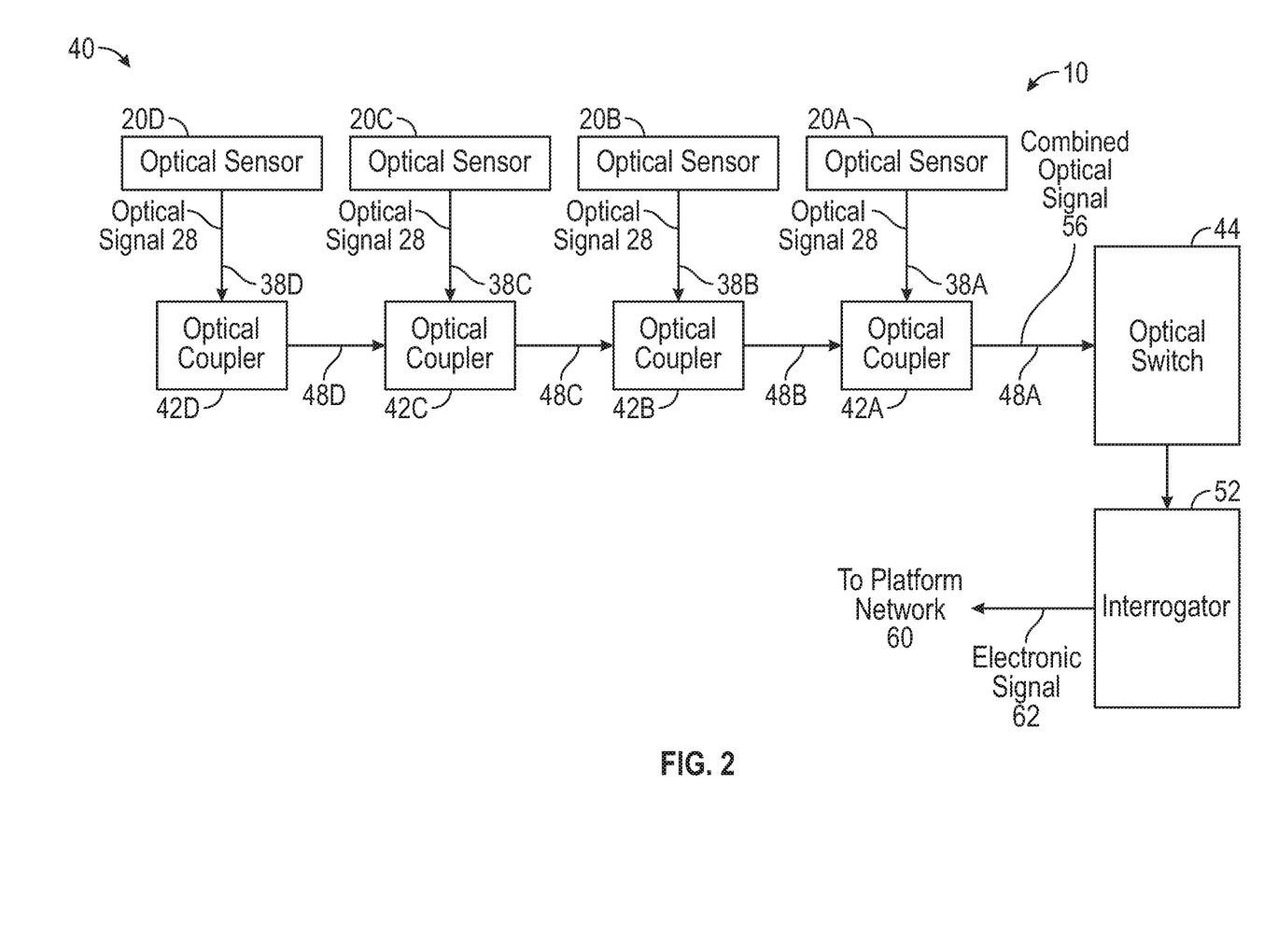
FIG. 2 is a schematic diagram illustrating a portion of a disclosed optical network, according to an exemplary embodiment.
Figure 3:
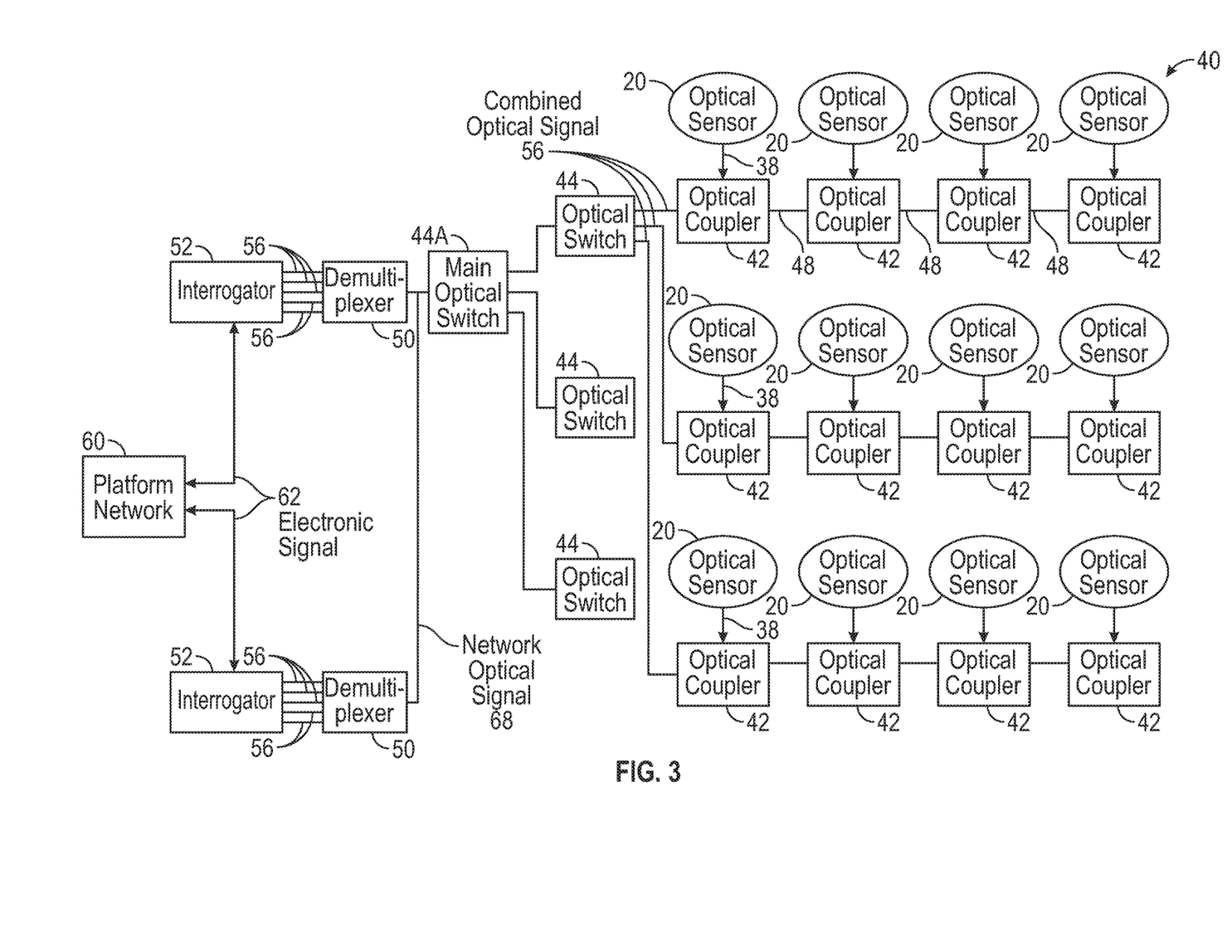
FIG. 3 is a schematic diagram illustrating the optical network, which includes a platform network, according to an exemplary embodiment.
Figure 4A:
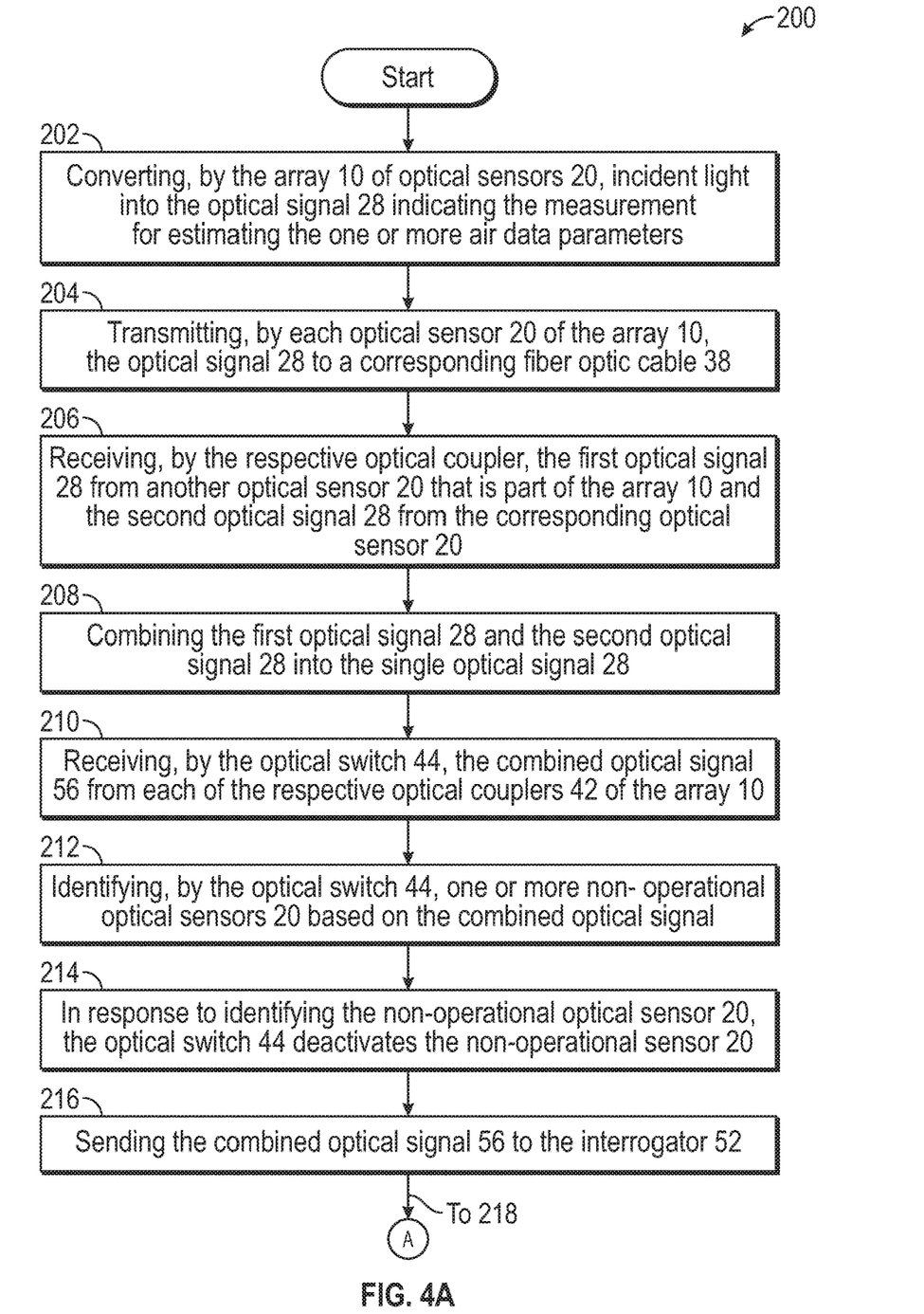
FIGS. 4A-4B are a process flow diagram illustrating a method for collecting measurements for estimating air data parameters for the disclosed aerospace vehicle, according to an exemplary embodiment.

FIG. 2 is a schematic diagram illustrating a portion of an optical network 40, and FIG. 3 is a schematic diagram of the optical network 40 for the aerospace vehicle 26. It is to be appreciated that the optical network 40 shown in FIG. 3 includes a plurality of arrays 10 of optical sensors 20. Referring now to FIGS. 1 and 2, a respective optical coupler 42 is provided for each optical sensor 20 of the array 10, where the corresponding fiber optic cable 38 electrically connects a respective optical sensor 20 to the respective optical coupler 42, and another fiber optic cable 48 electrically couples the optical couplers 42 to one another. In the non-limiting embodiment as shown in FIG. 4, the array 10 only includes four optical sensors 20A, 20B, 20C, and 20D, however, it is to be appreciated that FIG. 4 is merely exemplary in nature, and any number of optical sensors 20 may be included as part of the array 10.

The optical couplers 42A, 42B, 42C, 4D are each configured to combine two optical signals into a single optical signal. Specifically, for example, a respective optical coupler 42B for a corresponding optical sensor 20B receives as input a first optical signal 28 from another optical sensor 20C that is part of the array 10 and a second optical signal 28 from the corresponding optical sensor 20B. The optical coupler 42B combines the first optical signal 28 and the second optical signal 28 together into a single optical signal 28. The single optical signal 28 is transmitted by the fiber optic cable 48B. It is to be appreciated that although the optical coupler 42B is described, this applies to all of the optical sensors 20 that are part of the array 10.

As seen in FIG. 2, an optical switch 44 is provided for the array 10 of optical sensors 20, where a single fiber optic cable 48A is in electrical communication with the optical switch 44. One of the optical couplers 42A of the array 10 of optical sensors 20 transmits a combined optical signal 56 to the optical switch 44 of the array 10 of the optical sensors 20. The combined optical signal 56 received by the optical switch 44 is a combination of the optical signals 28 generated by each of the optical sensors 20 that are part of the array 10. The optical switch 44 is configured to identify one or more non-operational optical sensors 20. In response to identifying a non-operational optical sensor 20, the optical switch 44 deactivates the non-operational optical sensor 20. It is to be appreciated that an optical sensor 20 may be non-operational if the optical sensor 20 is corrupt or, alternatively, if the optical sensor 20 is unable to generate data.

In one embodiment, each optical switch 44 is a micro electro-mechanical system (MEMS) device including steerable micro-mirror arrays that direct an input optical signal to an output port. The optical switch 44 is configured to connect the array 10 of the optical sensors 20 to one of the plurality of interrogators 52 (FIG. 3) that are part of the optical network 40. Referring back to FIG. 2, each interrogator 52 is configured to measure a wavelength of the combined optical signal 56. The interrogator 52 is also configured to convert the wavelength of the combined optical signal 56 into an electronic signal 62 indicating the measurement for estimating the one or more air data parameters. The interrogator 52 is configured to send the electronic signal 62 indicating the measurement to a platform network 60 (seen in FIG. 3) for estimating the one or more air data parameters of the aerospace vehicle 26.

Figure 4B:
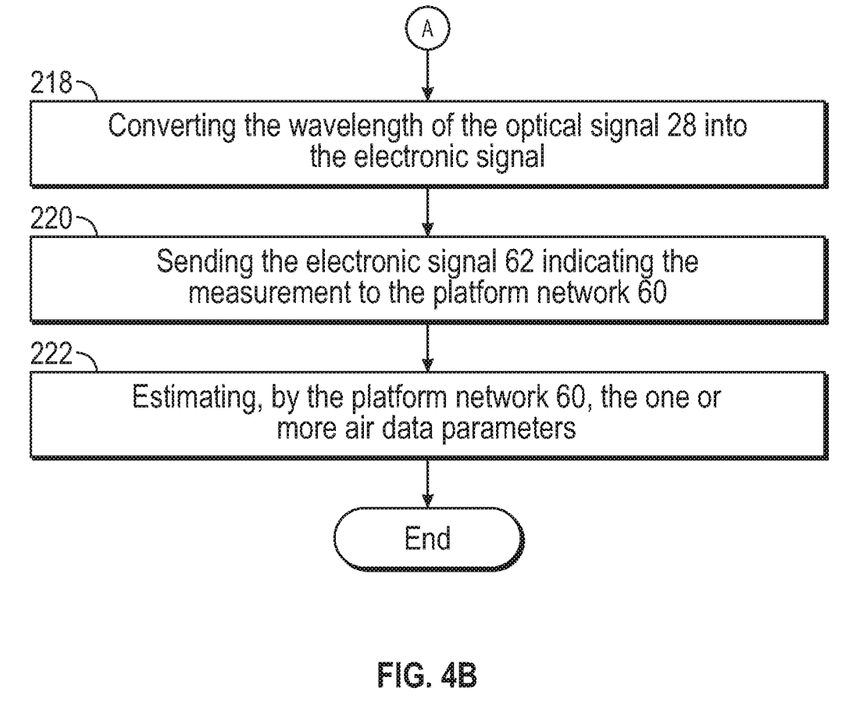

FIGS. 4A-4B illustrate an exemplary process flow diagram for a method 200 of collecting measurements for estimating one or more air data parameters of the aerospace vehicle 26. Referring to FIGS. 1-2 and 4A, the method 200 begins at block 202. In block 202, the array 10 of optical sensors 20 convert incident light into the optical signal 28 indicating the measurement for estimating the one or more air data parameters. As seen in FIG. 1, the array 10 of optical sensors 20 is disposed along the skin 24 of the aerospace vehicle 26. The method 200 may then proceed to block 204.

In block 204, each optical sensor 20 of the array 10 of optical sensors transmits the optical signal 28 to a corresponding fiber optic cable 38, where the corresponding fiber optic cable 38A electrically connects a corresponding optical sensor 20A to the corresponding optical coupler 42. The method 200 may then proceed to block 206.

In block 206, the respective optical coupler 42 for the corresponding optical sensor 20 receives the first optical signal 28 from another optical sensor 20 that is part of the array 10 and the second optical signal 28 from the corresponding optical sensor 20. The method 200 may then proceed to block 208.

In block 208, the respective optical coupler 42 combines the first optical signal 28 and the second optical signal 28 into a single optical signal 28. The method 200 may then proceed to block 210.

In block 210, the optical switch 44 receives the combined optical signal 56 from each of the respective optical couplers 42 of the array 10, where the combined optical signal 56 is a combination of each optical signal generated by each optical sensor 20 that is part of the array 10. The method 200 may then proceed to block 212.

In block 212, the optical switch 44 identifies one or more non-operational optical sensors 20 based on the combined optical signal 56. The method 200 may then proceed to block 214.

In block 214, in response to identifying the non-operational optical sensor, the optical switch 44 deactivates the non-operational optical sensor 20. The method 200 then proceeds to block 216.

In block 216, the combined optical signal 56 is sent to the interrogator 52. The method 200 may then proceed to block 218, which is shown in FIG. 4B.

In block 218, the interrogator 52 converts the wavelength of the combined optical signal 56 into the electronic signal 62 indicating the measurement for estimating the one or more air data parameters. The method 200 may then proceed to block 220.

In block 220, the electronic signal 62 indicating the measurement is sent to the platform network 60 for estimating the one or more air data parameters of the aerospace vehicle 26. The method 200 may then proceed to block 222.

In block 222, the platform network 60 estimates the one or more air data parameters. The method 200 may then terminate.

Referring to FIG. 3, the entire optical network 40 for the aerospace vehicle 26 is described, where the optical network 40 includes a plurality of arrays 10 of optical sensors 20. It is to be appreciated that FIG. 3 illustrates only three arrays 10 of sensors 20 for purposes of simplicity and clarity, and that the optical network 40 may include any number of arrays 10. For example, one type of aircraft may include hundreds of arrays 10. As seen in FIG. 3, each array 10 of optical sensors 20 is in electrical communication with the corresponding optical switch 44. A main optical switch 44A is in electrical communication with the corresponding optical switches 44 for each array 10 of optical sensors 20 that is part of the optical network 40. The main optical switch 44A is configured to identify a non-operational array 10 of sensors 20. In response to identifying a non-operational array 10 of optical sensors 20, the main optical switch 44A deactivates the non-operational array 10.

The main optical switch 44A is in electronic communication with one or more demultiplexers 50. In the non-limiting embodiment as shown in FIG. 3, two demultiplexers 50 are shown, however, it is to be appreciated that FIG. 3 is merely exemplary in nature. The demultiplexers 50 each receive as input a network optical signal 68 from the main optical switch 44A. The network optical signal 68 is a combination of the combined optical signal 56 for each array 10 of optical sensors 20 that are part of the optical network 40 of the aerospace vehicle 26. The demultiplexers 50 are each configured to separate the network optical signal 68 into a plurality of combined optical signals 56, where each combined optical signal 56 corresponds to one of the arrays 10 of optical sensors 20 that are part of the optical network 40. The demultiplexers 50 send the plurality of combined optical signals 56 to the plurality of interrogators 52.

The plurality of interrogators 52 are configured to measure the wavelength of the combined optical signal 56 for each array 10 of optical sensors 20 that are part of the optical network 40. The plurality of interrogators 52 are configured to convert the wavelength of the combined optical signal 56 for each array 10 of sensors 20 into a corresponding electronic signal 62 indicating the measurement for estimating the one or more air data parameters. Thus, each interrogator 52 provides redundancy, which in turn enhances reliability of the optical network. The plurality of interrogators 52 are configured to send the corresponding electronic signal 62 for each array 10 of optical sensors 20 of the optical network 40 to the platform network 60 for estimating the one or more air data parameters of the aerospace vehicle 26. It is to be appreciated that the platform network 60 receives a plurality of values for the corresponding electronic signal 62 for each array 10 of sensors 20 that are part of the optical network 40, which in turn improve reliability.

Figure 5A:
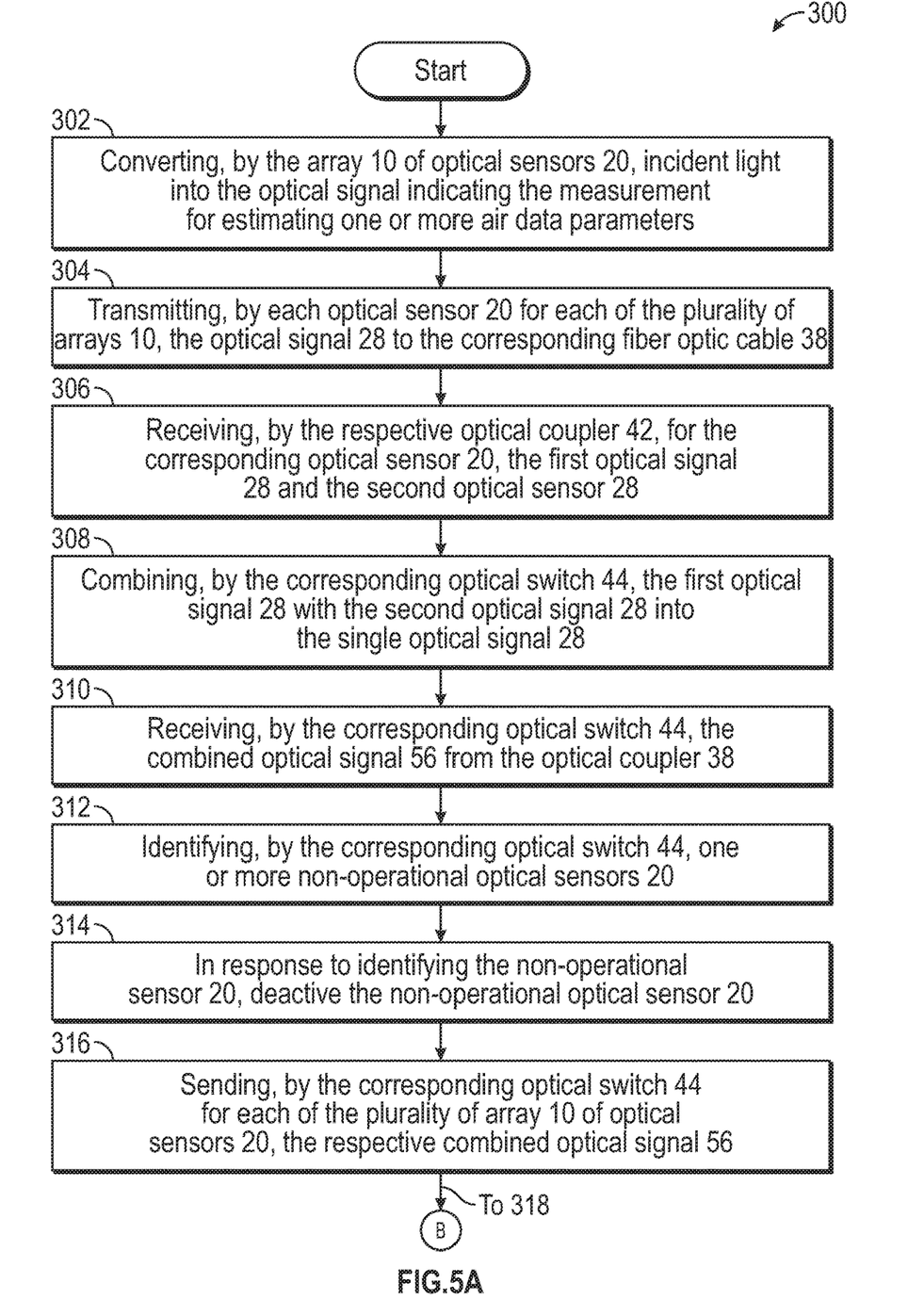
FIG. 5A-5B are a process flow diagram illustrating a method for collecting measurements using the optical network as shown in FIG. 3.
Figure 5B:
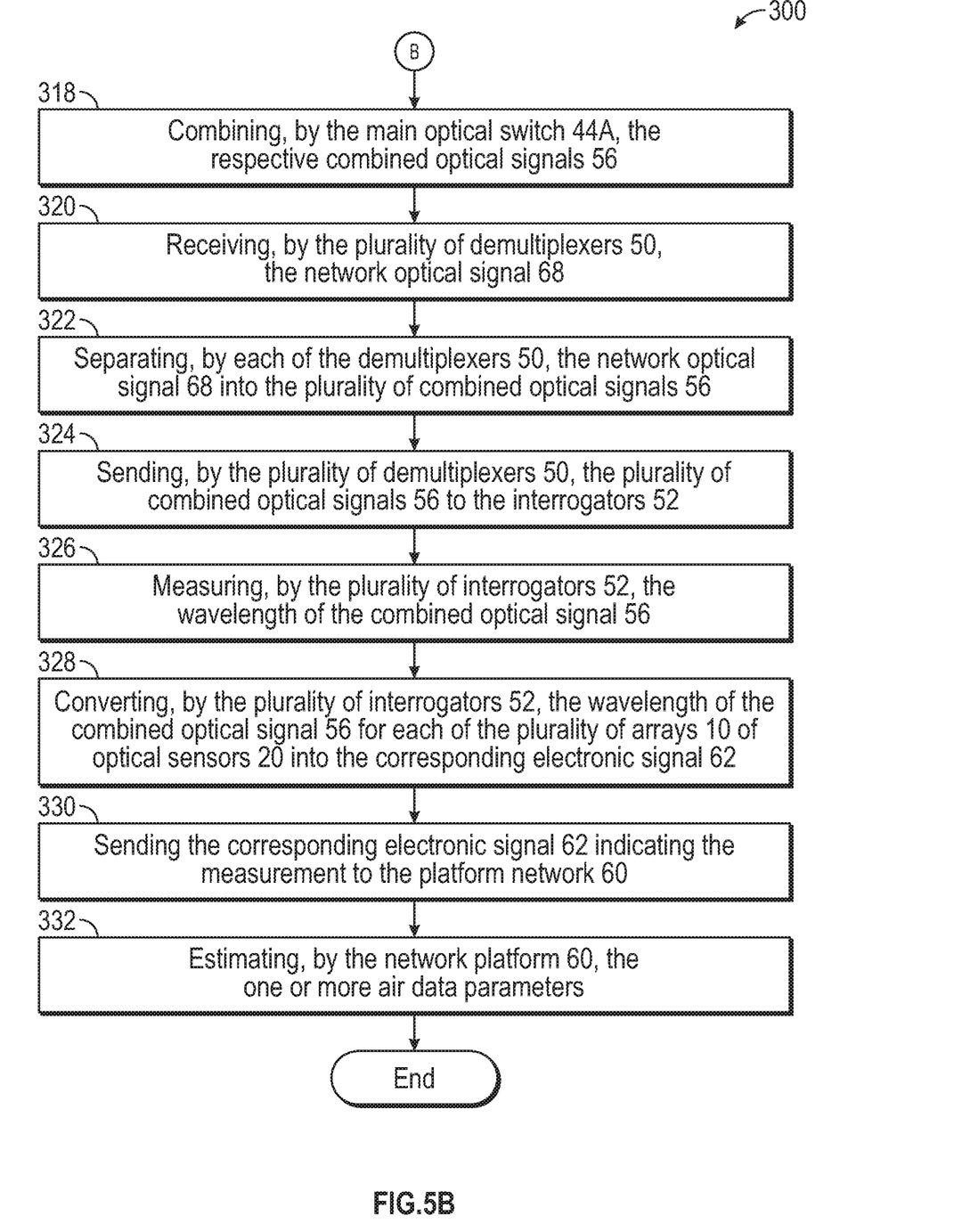

FIGS. 5A-5B illustrate a method 300 of collecting measurements for estimating one or more air data parameters by the optical network 40 shown in FIG. 3. Referring to FIGS. 1, 3, and 5A-5B, the method 300 begins at block 302. In block 302, the array 10 of optical sensors 20 converts incident light into the optical signal 28 indicating a measurement for estimating the one or more air data parameters. As seen in FIG. 1, the array 10 of optical sensors 20 is disposed along the skin 24 of the aerospace vehicle 26. As seen in FIG. 3, the optical network 40 includes a plurality of arrays 10 of optical sensors 20. The method 300 may then proceed to block 304.

In block 304, each optical sensor 20 for each of the plurality of arrays 10 of optical sensors 20 transmits the optical signal 28 to the corresponding fiber optic cable 38. As seen in FIG. 3, the corresponding fiber optic cable 38 is coupled to the corresponding optical sensor 20. The method 300 may then proceed to block 306.

In block 306, the respective optical coupler 42 for the corresponding optical sensor 20 receives the first optical signal 28 from another optical sensor 20 that is part of the array 10 and the second optical signal 28 from the corresponding optical sensor 20. The method 300 may then proceed to block 308.

In block 308, the respective optical coupler 42 combined the first optical signal 28 with the second optical signal 28 into the single optical signal 28. The method 300 may then proceed to block 310.

In block 310, the corresponding optical switch 44 receives the combined optical signal 56 from the optical coupler 42 corresponding to one of the plurality of arrays 10 of optical sensors 20. The combined optical signal 56 is a combination of each optical signal for an individual array 10 of optical sensors 20. The method 300 may then proceed to block 312.

In block 312, the corresponding optical switch 44 identifies one or more non-operational optical sensors 20 based on the combined optical signal 56. The method 300 may then proceed to block 314.

In block 314, in response to identifying the non-operational optical sensor 20, the optical switch 44 deactivates the non-operational optical sensor 20. The method 300 may then proceed to block 316.

In block 316, the corresponding optical switch 44 for each of the plurality of arrays 10 of optical sensors 20 sends the respective combined optical signal 56 to the main optical switch 44A. The method 300 may then proceed to block 318, which is shown in FIG. 5B.

In block 318, the main optical switch 44A combines the respective combined optical signal 56 for each of the plurality of arrays 10 of optical sensors 20 that are part of the optical network 40 into the network optical signal 68. The method 300 ma then proceed to block 320.

In block 320, the plurality of demultiplexers 50 receive the network optical signal 68 from the main optical switch 44A. The method 300 may then proceed to block 322.

In block 322, each of the plurality of demultiplexers 50 separate the network optical signal 68 into the plurality of combined optical signals 56, where each combined optical signal 56 corresponds to one of the arrays 10 of optical sensors 20 that are part of the optical network 40. The method 300 may then proceed to block 324.

In block 324, the plurality of demultiplexers 50 send the plurality of combined optical signals 56 to the plurality of interrogators 52. The method 300 may then proceed to block 326.

In block 326, the plurality of interrogators 52 measure the wavelength of the combined optical signal 56 for each of the plurality of arrays 10 of optical sensors 20 that are part of the optical network 40. The method 300 may then proceed to block 328.

In block 328, the plurality of interrogators 52 convert the wavelength of the combined optical signal 56 for each of the plurality of arrays 10 of optical sensors 20 into the corresponding electronic signal 62 indicating the measurement for estimating the one or more air data parameters. The method 300 may then proceed to block 330.

In block 330, the corresponding electronic signal 62 indicating the measurement to is sent to the platform network 60 for estimating the one or more air data parameters of the aerospace vehicle 26. The method 300 may then proceed to block 332.

In block 332, the platform network 60 estimates the one or more air data parameters. The method 300 may then terminate.

Referring generally to the figures, the disclosed optical network provides various technical effects and benefits. Some of the advantages of the optical sensors include, but are not limited to, enhanced robustness as well as increased coverage over a larger area, which results in more data for processing. The optical sensors also provide increased accuracy, as they have reduced or negligible interference with airflow, require less maintenance and easier diagnosis, and do not introduce significant interference with the structure. Specifically, the disclosed optical sensors require smaller apertures in the skin and the internal volume of the aerospace vehicle when compared to conventional sensors. This may also result in eliminating large holes that are commonly drilled into the skin of the aerospace vehicle. It is to be appreciated that larger holes in the skin may require stress approval and periodic inspections. Moreover, the disclosed optical sensors may be placed in locations that are typically difficult for maintenance and other personnel to access. Finally, the optical sensors require far less power when compared to conventional air data sensors. For example, a pitot tube may require heaters to prevent moisture that accumulate in the pitot tube's pneumatic lines from freezing.

Figure 6:
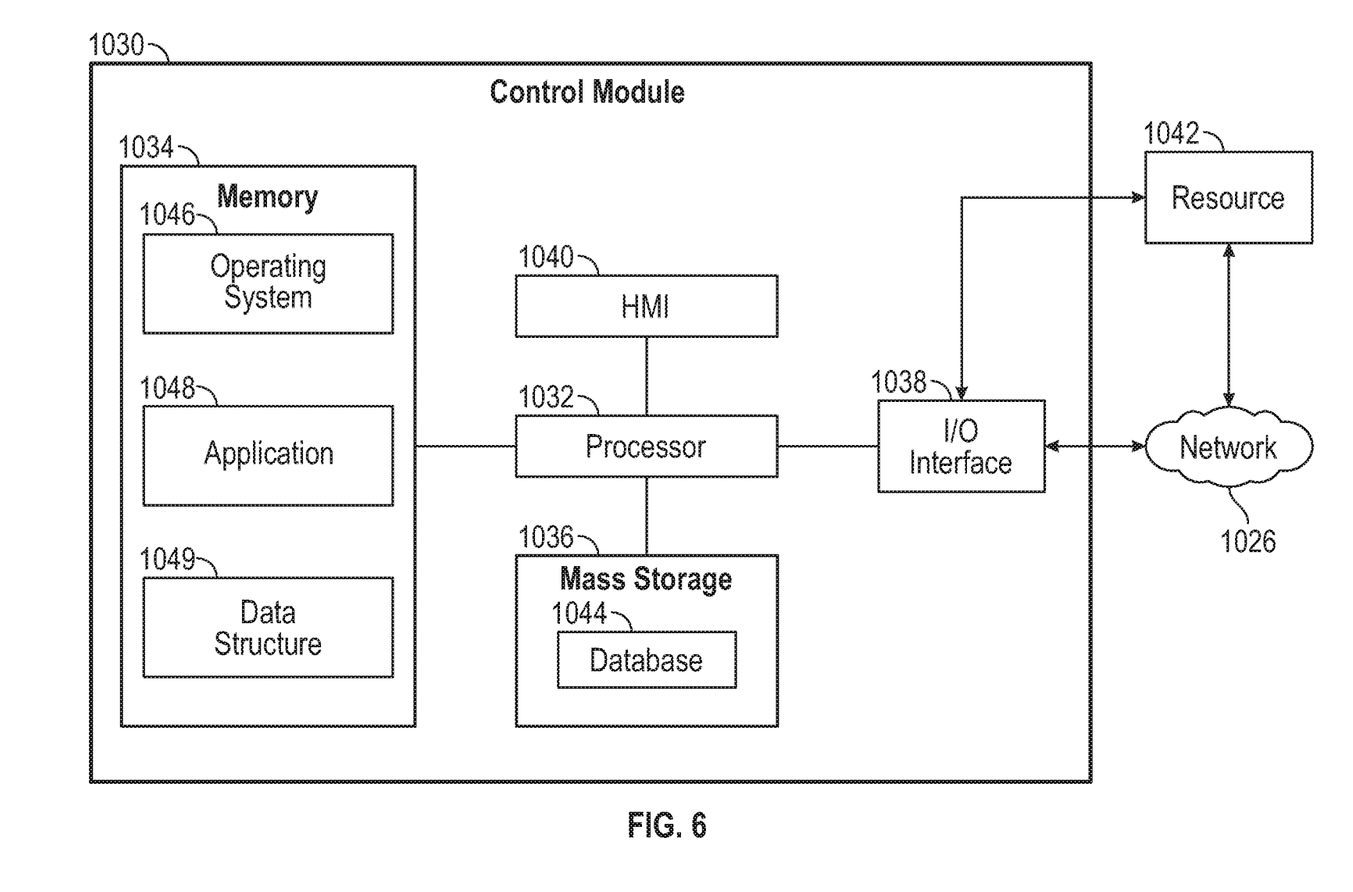
FIG. 6 is a computer system for the disclosed optical system and platform network shown in FIG. 3, according to an exemplary embodiment according to an exemplary embodiment.

Referring to FIG. 6, the disclosed platform network 60 is implemented on one or more computer devices or systems, such as exemplary computer system 1030. The computer system 1030 includes a processor 1032, a memory 1034, a mass storage memory device 1036, an input/output (I/O) interface 1038, and a Human Machine Interface (HMI) 1040. The computer system 1030 is operatively coupled to one or more external resources 1042 via the network 1026 or I/O interface 1038. External resources may include, but are not limited to, servers, databases, mass storage devices, peripheral devices, cloud-based network services, or any other suitable computer resource that may be used by the computer system 1030.

The processor 1032 includes one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1034. Memory 1034 includes a single memory device or a plurality of memory devices including, but not limited to, read-only memory (ROM), random access memory (RAM), volatile memory, non-volatile memory, static random-access memory (SRAM), dynamic random-access memory (DRAM), flash memory, cache memory, or any other device capable of storing information. The mass storage memory device 1036 includes data storage devices such as a hard drive, optical drive, tape drive, volatile or non-volatile solid-state device, or any other device capable of storing information.

The processor 1032 operates under the control of an operating system 1046 that resides in memory 1034. The operating system 1046 manages computer resources so that computer program code embodied as one or more computer software applications, such as an application 1048 residing in memory 1034, may have instructions executed by the processor 1032. In an alternative example, the processor 1032 may execute the application 1048 directly, in which case the operating system 1046 may be omitted. One or more data structures 1049 also reside in memory 1034, and may be used by the processor 1032, operating system 1046, or application 1048 to store or manipulate data.

The I/O interface 1038 provides a machine interface that operatively couples the processor 1032 to other devices and systems, such as the network 1026 or external resource 1042. The application 1048 thereby works cooperatively with the network 1026 or external resource 1042 by communicating via the I/O interface 1038 to provide the various features, functions, applications, processes, or modules comprising examples of the disclosure. The application 1048 also includes program code that is executed by one or more external resources 1042, or otherwise rely on functions or signals provided by other system or network components external to the computer system 1030. Indeed, given the nearly endless hardware and software configurations possible, persons having ordinary skill in the art will understand that examples of the disclosure may include applications that are located externally to the computer system 1030, distributed among multiple computers or other external resources 1042, or provided by computing resources (hardware and software) that are provided as a service over the network 1026, such as a cloud computing service.

The HMI 1040 is operatively coupled to the processor 1032 of computer system 1030 in a known manner to allow a user to interact directly with the computer system 1030. The HMI 1040 may include video or alphanumeric displays, a touch screen, a speaker, and any other suitable audio and visual indicators capable of providing data to the user. The HMI 1040 also includes input devices and controls such as an alphanumeric keyboard, a pointing device, keypads, pushbuttons, control knobs, microphones, etc., capable of accepting commands or input from the user and transmitting the entered input to the processor 1032.

A database 1044 may reside on the mass storage memory device 1036 and may be used to collect and organize data used by the various systems and modules described herein. The database 1044 may include data and supporting data structures that store and organize the data. In particular, the database 1044 may be arranged with any database organization or structure including, but not limited to, a relational database, a hierarchical database, a network database, or combinations thereof. A database management system in the form of a computer software application executing as instructions on the processor 1032 may be used to access the information or data stored in records of the database 1044 in response to a query, where a query may be dynamically determined and executed by the operating system 1046, other applications 1048, or one or more modules.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of collecting measurements for estimating one or more air data parameters of an aerospace vehicle, the method comprising:
converting, by an array of optical sensors, incident light into an optical signal indicating a measurement for estimating the one or more air data parameters, wherein the array of optical sensors is disposed along a skin of the aerospace vehicle and are embedded in a thin film;
measuring, by an interrogator, a wavelength of a combined optical signal, wherein the combined optical signal is a combination of the optical signals generated by each of the optical sensors that are part of the array;
converting, by the interrogator, the wavelength of the optical signal into an electronic signal indicating either the measurement for estimating the one or more air data parameters; and
sending the electronic signal indicating the measurement to a platform network for estimating the one or more air data parameters of the aerospace vehicle.

2. The method of claim 1, further comprising estimating, by the platform network, the one or more air data parameters.

3. The method of claim 1, wherein the measurement is either pressure data or temperature data.

4. The method of claim 1, wherein the array of optical sensors include individual optical sensors that are constructed of silicon.

5. The method of claim 1, wherein the array of optical sensors is completely embedded in a thin film.

6. The method of claim 1, further comprising:
transmitting, by each optical sensor of the array of optical sensors, the optical signal to a corresponding fiber optic cable, wherein the corresponding fiber optic cable is coupled to a corresponding optical sensor that is part of the array of optical sensors.

7. The method of claim 6, wherein a respective optical coupler is provided for each optical sensor of the array, wherein the corresponding fiber optic cable electrically connects a respective optical sensor to respective optical couplers.

8. The method of claim 7, further comprising:
receiving, by the respective optical coupler for the corresponding optical sensor, a first optical signal from another optical sensor that is part of the array and a second optical signal from the corresponding optical sensor; and
combining, by the respective optical coupler, the first optical signal from another optical sensor and the second optical signal from the corresponding optical sensor into a single optical signal.

9. The method of claim 7, further comprising:
receiving, by an optical switch, the combined optical signal from each of the respective optical couplers of the array, wherein the combined optical signal is a combination of each optical signal generated by each optical sensor that is part of the array;
identifying, by the optical switch, one or more non-operational optical sensors based on the combined optical signal; and
in response to identifying the non-operational optical sensor, deactivating the non-operational optical sensor.

10. The method of claim 9, wherein the optical switch is a micro electro-mechanical system (MEMS) device.

11. A method of collecting measurements for estimating one or more air data parameters by an optical network that is part of an aerospace vehicle, the method comprising:
converting, by an array of optical sensors, incident light into an optical signal indicating either a measurement for estimating the one or more air data parameters, wherein the array of optical sensors is disposed along a skin of the aerospace vehicle and are embedded in a thin film, and wherein the optical network includes a plurality of arrays of optical sensors;
measuring, by a plurality of interrogators, a wavelength of a combined optical signal for each of the plurality of arrays of optical sensors that are part of the optical network;
converting, by the plurality of interrogators, the wavelength of the combined optical signal for each of the plurality of arrays of optical sensors into a corresponding electronic signal indicating the measurement for estimating the one or more air data parameters; and
sending the corresponding electronic signal indicating the measurement to a platform network for estimating the one or more air data parameters of the aerospace vehicle.

12. The method of claim 11, further comprising estimating, by the platform network, the one or more air data parameters.

13. The method of claim 11, wherein the measurement is either pressure data or temperature data.

14. The method of claim 11, wherein each of the plurality of arrays of optical sensors include individual optical sensors that are constructed of silicon.

15. The method of claim 11, wherein each of the plurality of arrays of optical sensors are completely embedded in a thin film.

16. The method of claim 11, further comprising:
transmitting, by each optical sensor for each of the plurality of arrays of optical sensors, the optical signal to a corresponding fiber optic cable, wherein the corresponding fiber optic cable is coupled to a corresponding optical sensor.

17. The method of claim 16, wherein a respective optical coupler is provided for each optical sensor for each of the plurality of arrays, wherein the corresponding fiber optic cable electrically connects a respective optical sensor to the respective optical coupler.

18. The method of claim 17, further comprising:
receiving, by the respective optical coupler for the corresponding optical sensor, a first optical signal from another optical sensor that is part of the array and a second optical signal from the corresponding optical sensor; and
combining, by the respective optical coupler, the first optical signal from another optical sensor and the second optical signal from the corresponding optical sensor into a single optical signal.

19. The method of claim 18, further comprising:
receiving, by a corresponding optical switch, a combined optical signal from the optical coupler corresponding to one of the plurality of arrays of optical sensors, wherein the combined optical signal is a combination of each optical signal for an individual array of optical sensors;

identifying, by the corresponding optical switch, one or more non-operational optical sensors based on the combined optical signal; and in response to identifying the non-operational optical sensor, deactivating the non-operational optical sensor.

20. The method of claim 19, further comprising:

sending, by the corresponding optical switch for each of the plurality of array of optical sensors, a respective combined optical signal to a main optical switch;

combining, by the main optical switch, the respective combined optical signal for each of the plurality of arrays of optical sensors that are part of the optical network into a network optical signal;

receiving, by a plurality of demultiplexers, the network optical signal;

separating, by each of the plurality of interrogators, the network optical signal into a plurality of combined optical signals, where each combined optical signal corresponds to one of the arrays of optical sensors that are part of the optical network; and sending the plurality of combined optical signals to the plurality of interrogators.

\* \* \* \* \*